United States Patent
Jonas et al.

(10) Patent No.: US 10,598,545 B1
(45) Date of Patent: Mar. 24, 2020

(54) ADJUSTABLE HOUSING FOR SENSOR

(71) Applicant: Amazon Technologies, Inc., Seattle, WA (US)

(72) Inventors: Jude Royston Jonas, Hudson, NH (US); Dragan Pajevic, Arlington, MA (US); Craig Ropi, Medford, MA (US)

(73) Assignee: Amazon Technologies, Inc., Seattle, WA (US)

( * ) Notice: Subject to any disclaimer, the term of this patent is extended or adjusted under 35 U.S.C. 154(b) by 97 days.

(21) Appl. No.: 16/002,761

(22) Filed: Jun. 7, 2018

(51) Int. Cl.
*G01J 1/04* (2006.01)
*G01V 8/14* (2006.01)
*B65G 43/00* (2006.01)
*G01J 1/44* (2006.01)
*G01J 1/02* (2006.01)

(52) U.S. Cl.
CPC ............ *G01J 1/0403* (2013.01); *B65G 43/00* (2013.01); *G01J 1/0271* (2013.01); *G01J 1/44* (2013.01); *G01V 8/14* (2013.01)

(58) Field of Classification Search
CPC .......... G01J 1/44; G01J 1/0271; G01J 1/0403; B65G 43/00; G01V 8/14
See application file for complete search history.

(56) References Cited

U.S. PATENT DOCUMENTS 9,746,368 B2 *  8/2017  Kobayashi ............ G01J 1/0271
2019/0285465 A1 *  9/2019  Mizusaki .................. G01J 1/42

* cited by examiner

*Primary Examiner* — Tony Ko
(74) *Attorney, Agent, or Firm* — BakerHostetler

(57) ABSTRACT

An adjustable housing for a light sensor includes a biasing spring and an adjustment screw or cam shaft or other rotary means to adjust the sensor against the spring biasing force. In some embodiments, a detent mechanism can retain the sensor in a desired position and provide an audible click during adjustment. The housing can have a free-floating wall such that when tightening or locking the assembly in place, the wall does not deform and therefore does not affect the sensor alignment.

17 Claims, 7 Drawing Sheets

ADJUSTABLE HOUSING FOR SENSOR

BACKGROUND

The present invention relates to mechanical aspects of automation equipment, and more particularly to a housing having features to adjust the position or output of a sensor, such as a light sensor.

Transporting items in modern warehouse facilities, such as a package sort center, in which packages are moved within a facility, or fulfillment center occurs on a vast scale. One means to transport or sort packages (i.e., payloads) is to use mobile drive units to deliver packages within a facility.

For example, mobile drive units can be used to organize packages based on delivery route, as determined based on a postal code or other package features or information. Mobile drive units are self-powered robotic devices that travel on the floor of the warehouse guided by, for example, fiducial markers in or on the floor. In this manner, mobile drive units may follow a grid-like pattern to traverse from a starting point to a destination point, such as a drop-off location for a package. For another example, conveyors (such as belt or other conveyors) can be used to transport packages.

Often, conveyors have sensors, such as photoelectric sensors or proximity sensors, and/or other sensors, which monitor or control movement of the packages through facilities.

DETAILED DESCRIPTION OF ILLUSTRATIVE EMBODIMENTS

The inventors have found that in modern sort centers, fulfillment centers, and like facilities, vertically aligning numerous photoelectric sensors is time consuming, especially when items of various sizes are encountered, as the vertical alignment of the beam in some cases should be sufficiently accurate to be interrupted by thin objects, such as a mailer or padded envelope. And any angular (vertical) misalignment between the light source and the corresponding reflector is magnified such that every degree of error in the alignment of the sensor's light output can result in many or dozens of millimeters offset in light output.

Housing assemblies 10 and 110 include a capability to adjust the position and alignment of a photoelectric sensor. In this regard, the housing assemblies include a housing body, a spring to bias or preload the sensor, and a rotatable element that can be actuated (that is, turned) to move the sensor against the spring force, in a direction opposite the spring bias direction, thereby providing the adjustability feature. The rotatable element can be an adjustment screw or a cam shaft and/or other mechanism for moving the sensor housing into a desired angular position as determined by alignment parameters of the application. The rotatable element can have an optional detent that holds or helps to hold the rotatable element in place and provides an audible click as an aid in adjustment.

In the embodiments of the figures, a pivot shaft is formed by a shaft (such as a bolt) through a circular aperture of the sensor. A slotted opening is spaced apart from the pivot aperture. The slotted opening enables pivoting movement of the sensor about the pivot shaft in response to adjustments made by the adjustment screw or cam shaft. A locking bolt through the slotted opening squeezes the housing sidewalls against the sensor sidewalls to lock the sensor angular position when the final, adjusted position of the sensor has been reached. An anti-slip surface (such as a high friction pad) between the sensor walls and housing walls may be employed to enhance the hold of the housing walls to the sensor walls.

In the embodiments of the figures, one of the housing walls is a separate component relative to the main portion of the housing assembly. The free-floating sidewall is joined to the main housing body by pins such that upon tightening that the locking bolt and pivot shaft bolt, the free-floating sidewall is pulled inwardly (relative to the sensor and opposing housing sidewall) without distortion or deformation of the wall, which distortion or deformation might change the position of the sensor and interfere with proper alignment.

The housing assembly may be useful in a conveyor system, which system can include a reflector opposite the housing assembly. The housing assembly's adjustment features may be employed. The sensor may determine a position of an item on the conveyor, and thus operate the conveyor. For example, if the sensor determines that an item is too close to an edge, a controller may operate the conveyor in a backwards direction to transport the item away from the edge, or the controller may diminish acceleration and/or breaking so as to diminish the risk of the item falling off. The sensor may be used for any other purpose, as will be understood by persons familiar with light sensor technology.

Figure 10:
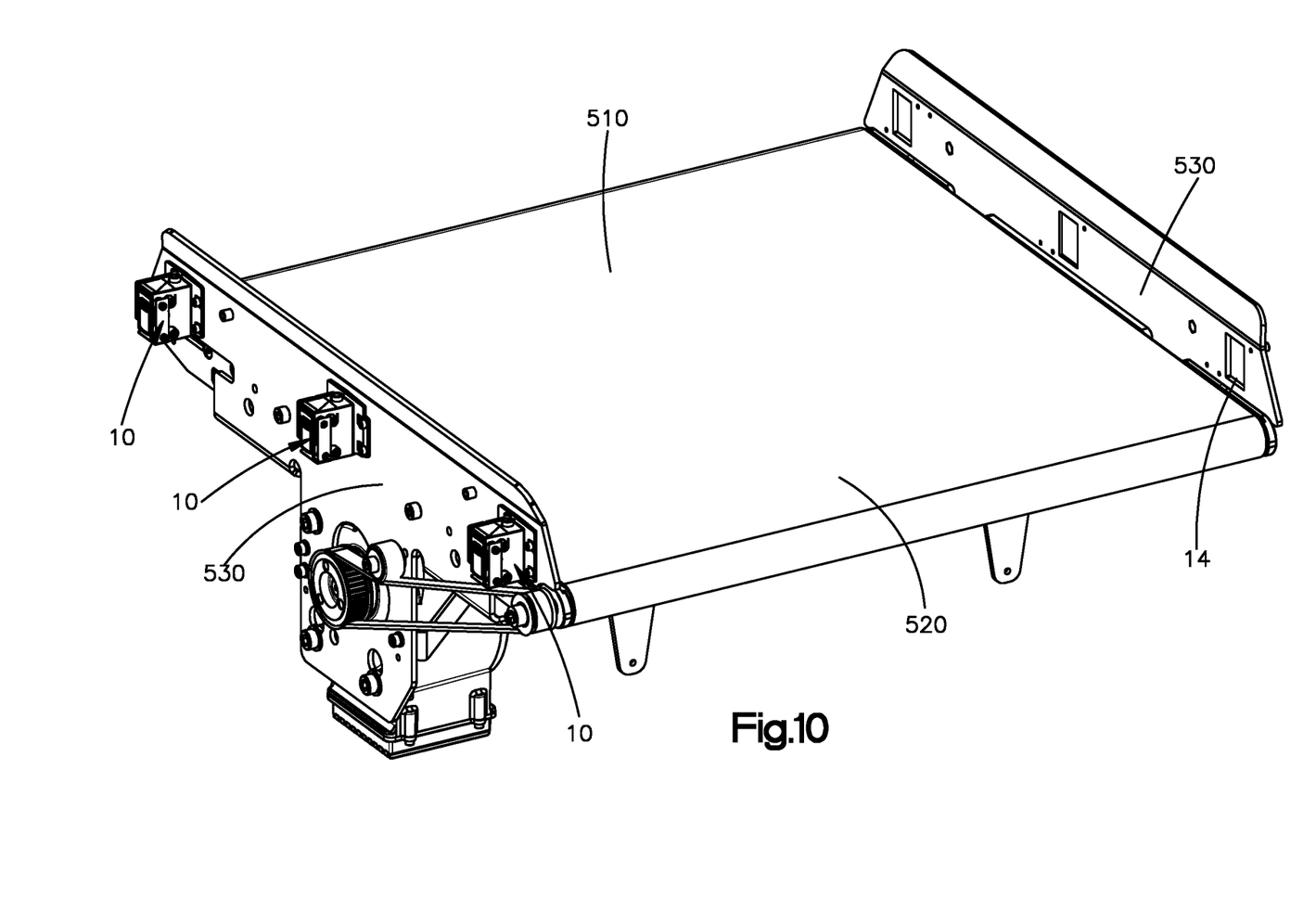
FIG. 10 is a view of a conveyor of the type that may employ the housing and sensor assemblies of FIG. 1 and FIG. 6.

Referring first to FIG. 10, a conveyor 510 is a type that can be carried by a mobile drive unit (not shown). Conveyor 510 includes a belt 520 and a pair of sheet metal sidewalls 530. Three housing assemblies 10 and opposing retroreflectors 14 are shown. In this regard, a housing assembly 10 (including a photoelectric sensor) can be positioned at opposing distal ends of conveyor 510 to indicate intake and/or discharge of an item (depending on the direction of the movement of belt 520) and can have another housing assembly 10 to enable flexible operation and control. Mobile drive units are battery powered. As explained more fully below, the present invention is not limited to use on a conveyor, nor to any conveyor configuration or type, nor to quantity or position of the housing and sensor assemblies.

The housing assembly 10 (and 110) holds a light sensor 80. Sensor 80 can be any type of light sensor, such as a unit that emits a light band and senses the reflection from a retroreflector and its interruption or break. Preferably, sensor 80 is a commercially available unit and housing assembly 10 is sized according to the dimensions of sensor 80, without limitation.

Referring to FIGS. 1 to 5 to illustrate a first embodiment, a housing assembly 10 includes a housing body 20, a leaf spring 50, and an adjustment screw 60. Housing assembly 10 is a box-like structure in which sensor 80 is held and includes a main housing body 30 and a removeable or free-floating sidewall, which is not unitary with main housing body 30. An optional rear wall is removed for illustration purposes. Main housing body 30 includes a top wall 32t, a sidewall 32s (opposite free-floating sidewall 40), and a bottom wall 32b. A mounting plate 36 is on the front face of housing assembly 10 includes an opening 12 on its front face through which the beam from sensor 80 transmits.

Pins 34 extend laterally or horizontally from top wall 32t and bottom wall 32b. Free-floating wall 40 includes recesses 44 into which pins 34 project. Pins 34 in recesses 44 keeping free-floating wall 40 from moving up and down and forward and backward, and permit wall 40 to be drawn into forcible contact with sensor 80, and prevent sidewall 40 from rotation in response to torque from the locking bolts, as explained more fully below.

Sensor 80 includes a body includes a sensor body top wall 82t, a pair of sidewalls 82s, and a bottom wall 82b. Sensor face 84 (FIG. 4) is exposed via housing opening 12 to emit a light, preferably in a beam form. Sensor 80 includes a shaft aperture 86 that is sized to receive a pivot shaft 76, such as a bolt. When a bolt is used for shaft 76, a shank (that is, unthreaded portion) may be employed for contacting the surface of shaft aperture 86. Aperture 86 and shaft 76 are sized such that sensor 80 can pivot about pivot shaft 76.

Sensor 80 also includes a slotted opening 88 that is formed in the sensor body. A fastener, referred to herein as locking bolt 78, extends through slot 88, which is positioned such that slot 88 permits limited pivoting of sensor body 80 about shaft 76.

Figure 1:
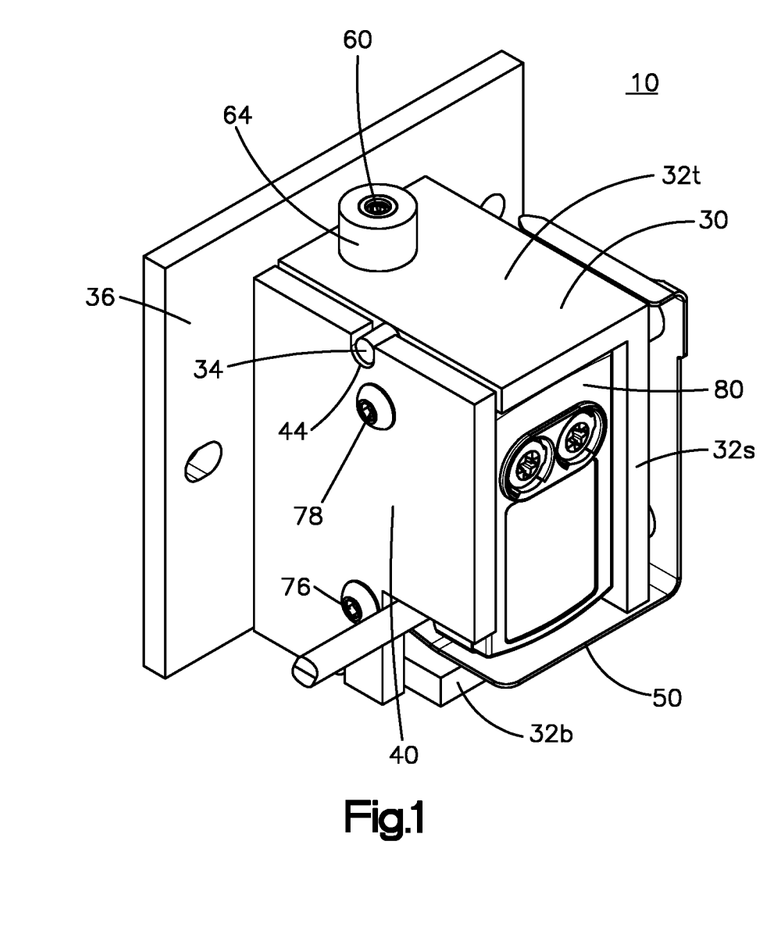
FIG. 1 is a top perspective view of a left rear side of a housing assembly and sensor according to a first embodiment.
Figure 2:
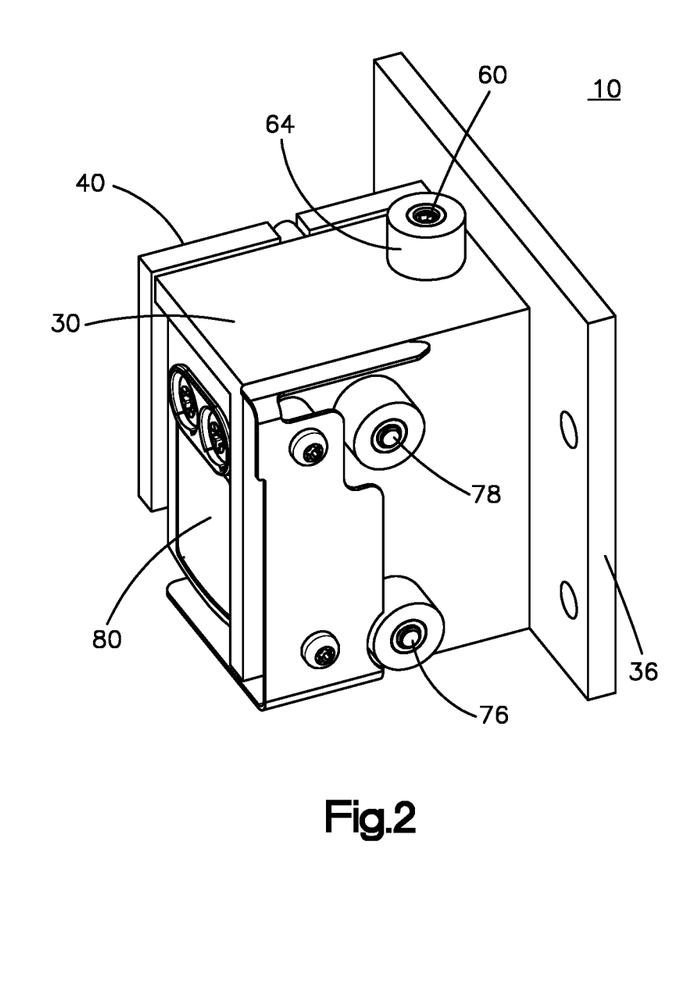
FIG. 2 is a top perspective view of a right rear side of the structure of FIG. 1.
Figure 3:
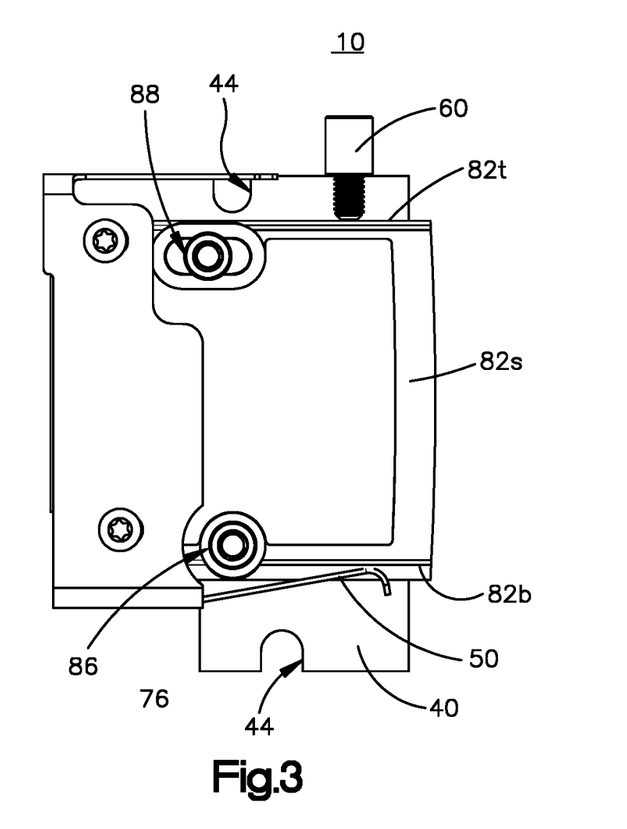
FIG. 3 is a side view of the structure of FIG. 1, with the main housing body and screw fitting removed to illustrate the sensor, free-floating sidewall, spring, and adjustment screw.

A leaf spring 50 is located on the inboard face of housing bottom wall 32b and contacts the sensor body bottom wall 82b to bias the sensor in one direction. In the embodiment of the figures, pivot shaft 76 is located near the rear of sensor 80 and spring 80 contacts the bottom wall 82b of sensor 80 to apply a force that tends to pivot sensor 80 upwardly in the front (that is, to raise the beam projection) or counterclockwise when oriented as shown in FIG. 3. Spring 50 is anchored to the housing by a vertically extending portion that is held to housing wall 32t by screws. Spring 50 is illustrated as having a forward-projecting finger, which is unused in the embodiment shown in FIG. 1, but used in second embodiment housing assembly 110, described below.

Adjustment screw 60 is threaded into a fitting 64 that is formed integral with (for example, threads formed in the top wall 32t) or that attaches to top wall 32t of housing assembly 10 (such as a threaded insert in a recess in the plastic top wall 32t) such that a distal tip of adjustment screw 60 contacts a sensor body top wall 32t near a forward portion thereof. Adjustment screw 60 may be any type of threaded device. For merely one example, adjustment screw can include a cap head screw with a nut below the head, which is referred to as a jam nut. Thus, the screw may be turned to adjust the position of sensor 80, and then the jam nut can be tightened against the top wall 82t to lock adjustment screw 60 into position. Top wall 32t may include a thickened portion to receive threads or a threaded insert. The downward force applied by adjustment screw 60 on sensor top wall 80t is applied opposite to the direction of the spring force from leaf spring 50.

Figure 4:
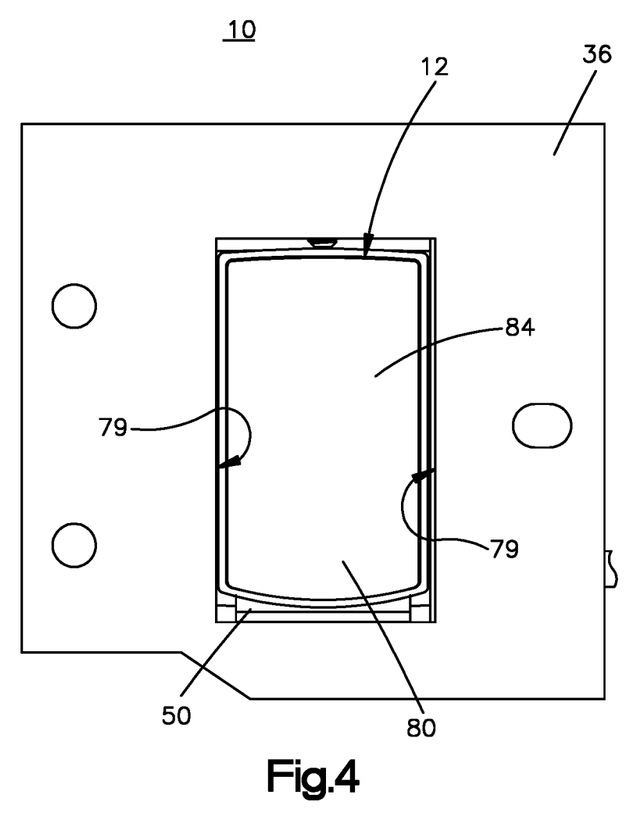
FIG. 4 is a front view of the structure of FIG. 1.
Figure 5:
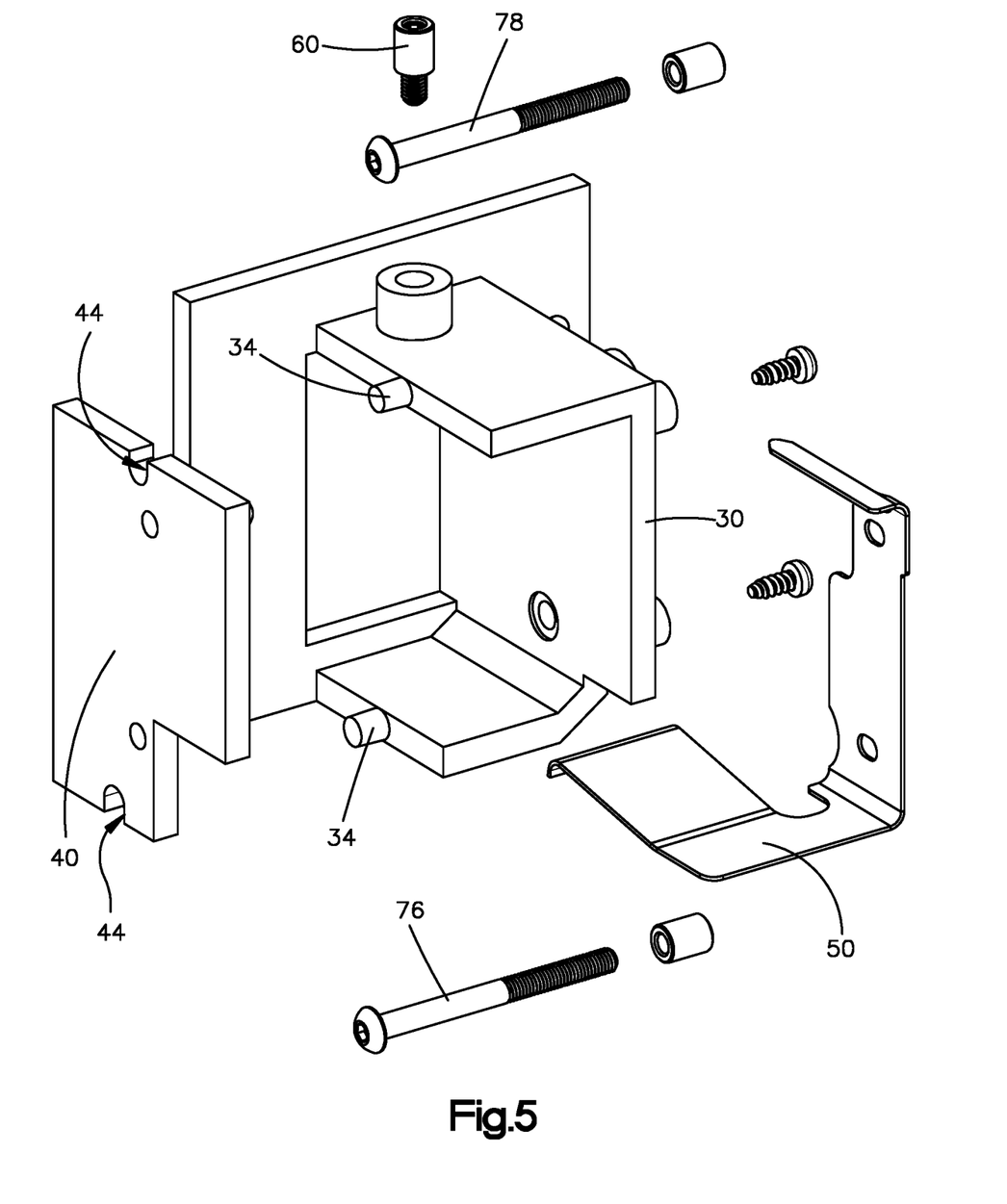
FIG. 5 is an exploded view of the housing assembly of FIG. 1 with the sensor removed for clarity.
Figure 6:
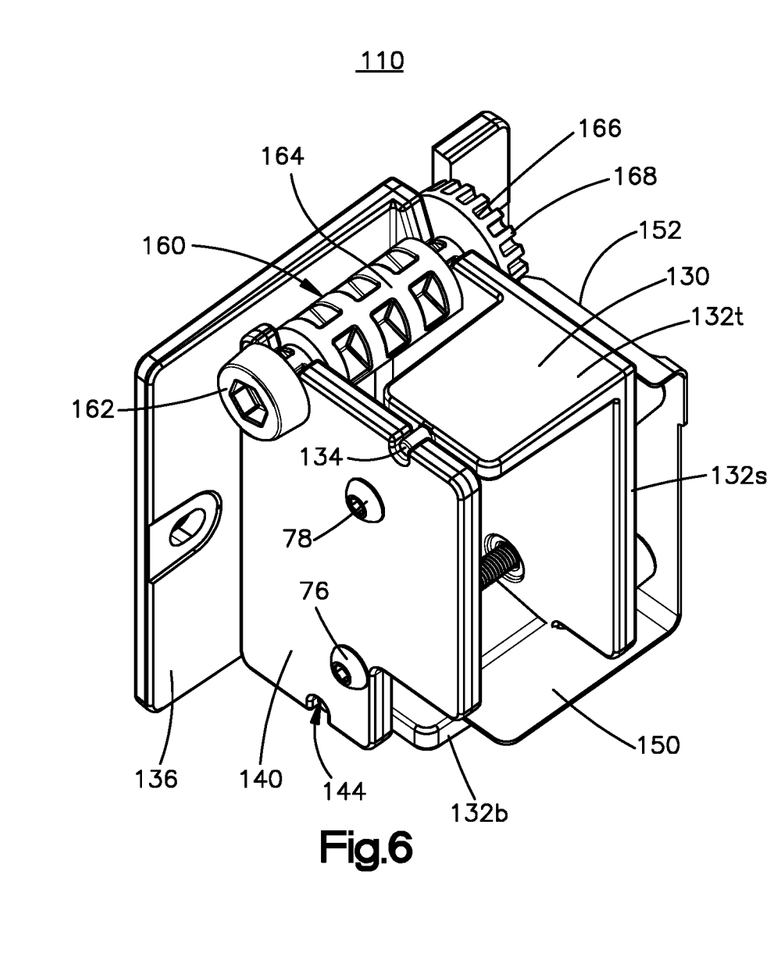
FIG. 6 is a top perspective view of a left rear side of a second embodiment housing assembly, with the sensor removed for clarity.

Housing 10 may be installed onto conveyor 510 first by fastening mounting plate 36 onto sidewall 530 of conveyor 510. FIG. 4 shows holes in mounting plate 36 that may be used for mounting. The light beam output from sensor 80 can be adjusted (up and down) within housing assembly 10 by pivoting sensor 80, which is also referred to herein as angular alignment. The upward and downward direction of the light beam output can be adjusted by turning adjustment screw 60 inward or outward to pivot sensor 80 about the axis defined by bolt 76. In some circumstances, the upward and downward adjustment is needed to ensure that the light beam can sense a mailer, which can have a height on the belt of as small as 10 mm.

When the desired position of sensor 80 is achieved. Locking bolt 78 and (optionally) shaft bolt 76 can be tightened, which draws free-floating sidewall 40 inwardly to contact the sidewall 82s of sensor 80. The recesses 44 slide on pins 34, and the pins 34 prevent sidewall 40 from twisting relative to main housing body 30 upon application of torque from locking bolt 78. Optionally, the sliding friction between walls 40 and 82s and between sidewalls 32s and 82s can be enhanced, such as providing an anti-slip surface between them, which insert is illustrated schematically by reference number 79. Anti-slip surface 79 can be any material that enhances the coefficient of friction between the surfaces, as will be understood by persons familiar with alignment of sensors.

Referring to FIGS. 6 through 9, a second embodiment housing assembly 110 may be employed. Housing assembly 110 includes a housing body 120, a leaf spring 150, and a cam shaft assembly 160. Housing assembly 110 is a box-like structure in which sensor 80 is held and includes a main housing body 130 and a removeable or separate wall, which is referred to herein as free-floating wall 140. An optional rear wall is removed for illustration purposes. Main housing body 130 includes a top wall 132t, a sidewall 132s, and a bottom wall 132b. A mounting plate 136 on the front face of housing assembly 110 includes an opening 112 on its front face through which the beam from sensor 80 transmits.

Pins 134 extend laterally or horizontally from top wall 132t and bottom wall 132b. Free-floating wall 140 includes recesses 144 into which pins 134 project.

Sensor 80, shaft bolt 76 and locking bolt 78 can be as described above for first embodiment housing assembly 10.

Figure 7:
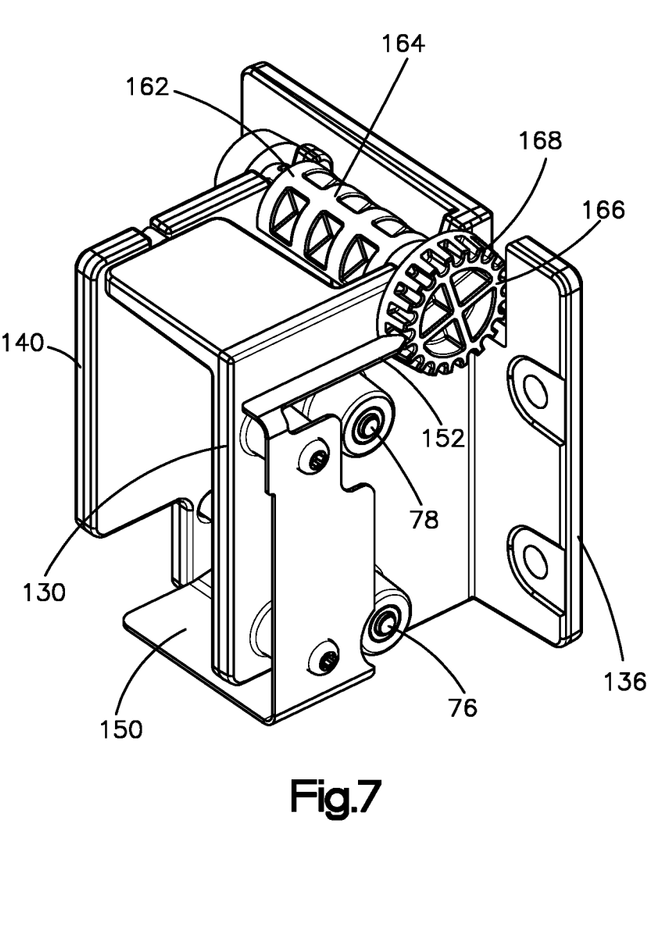
FIG. 7 is a top perspective view of a right rear side of the structure of FIG. 6.
Figure 8:
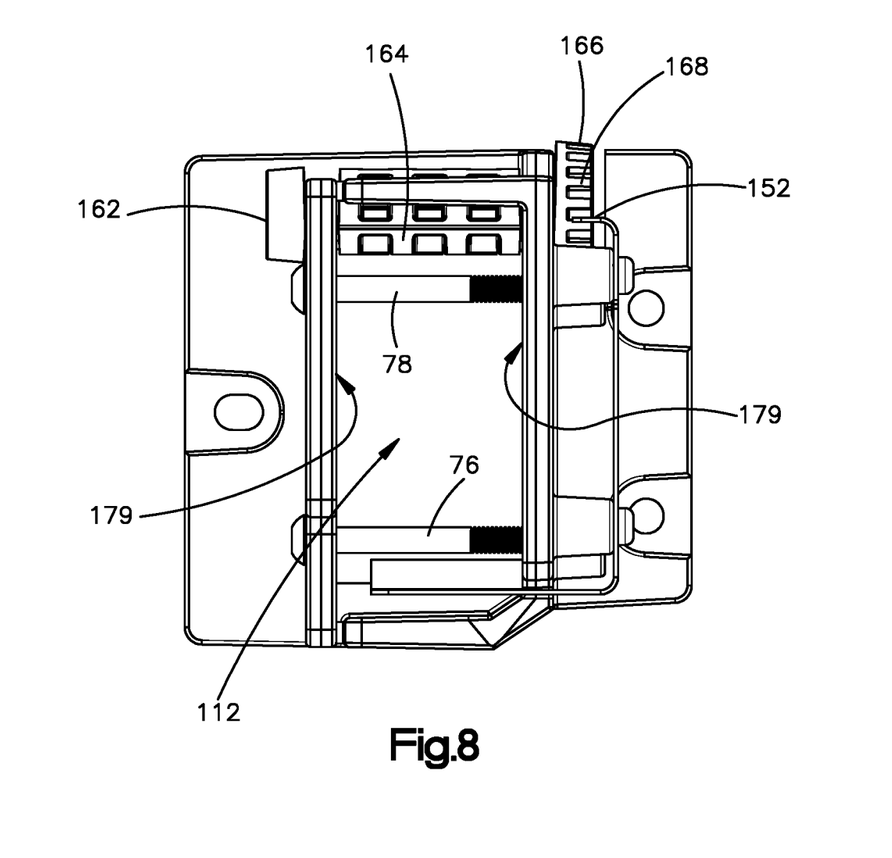
FIG. 8 is a rear view of the housing assembly of FIG. 6.
Figure 9:
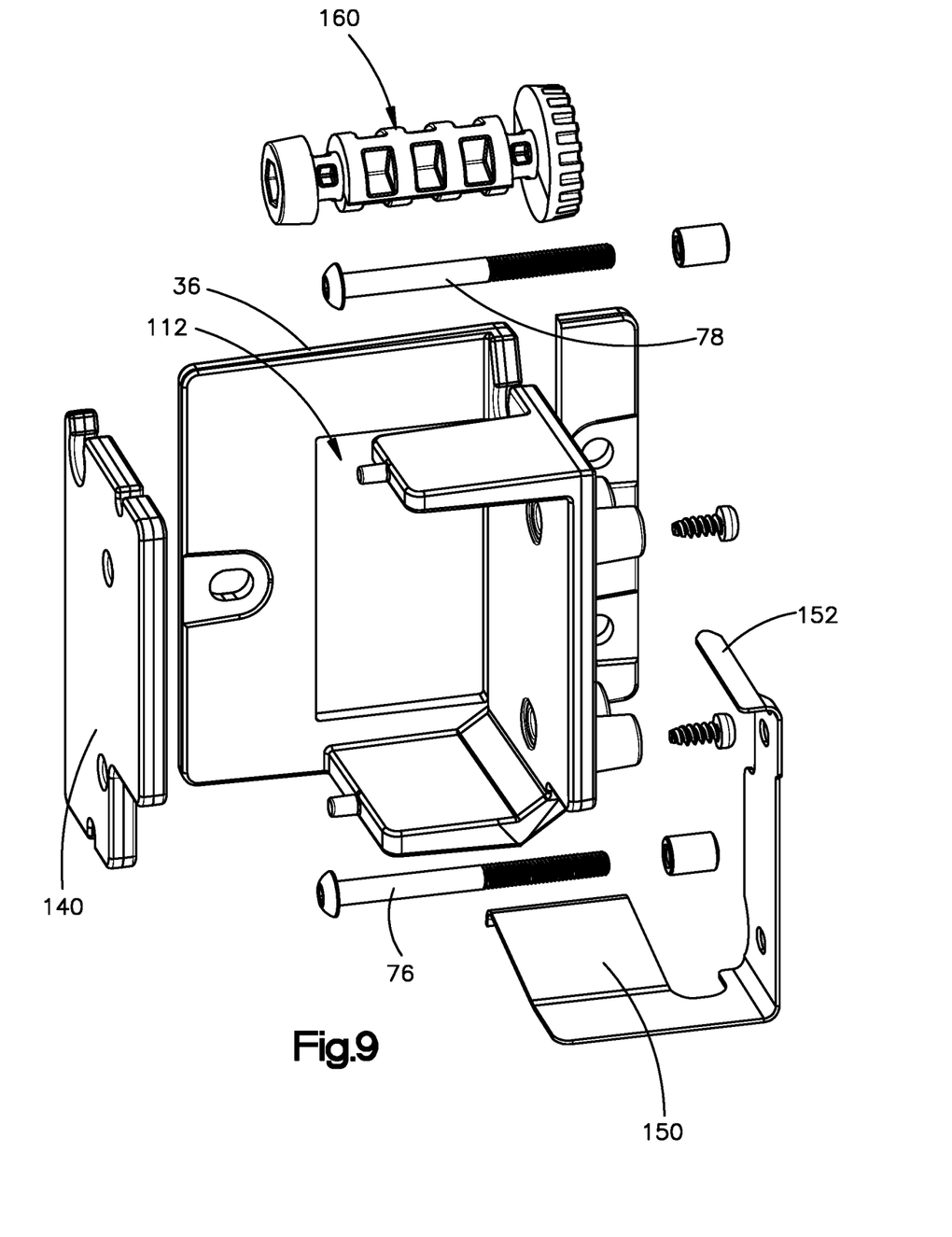
FIG. 9 is an exploded view of the housing assembly of FIG. 6.

A leaf spring 150 is located on the inboard face of housing bottom wall 132b and contacts the sensor body to bias the sensor in one direction. In the embodiment of the figures, pivot shaft 76 is located near the rear of sensor 80 and spring 150 contacts the bottom wall 82b of sensor 80 to apply a force that tends to pivot sensor 80 upwardly or counterclockwise when oriented as shown in FIG. 7. Spring 150 extends outwardly along the side of housing assembly 110 and includes a finger-like, elongate pawl 152.

Cam shaft assembly 160 includes a screw head 162, a horizontally oriented cam body 164, and a cogwheel or sprocket 166 opposite the screw head 162. Cam shaft 160 rotates in recesses 138 in housing assembly 110, which recesses provide bearing surfaces for shaft 160. Body 164 includes a cam surface 168 such that as screw heard 162 is turned, cam surface 168 applies a downward force on sensor top wall 82t in the direction opposite of the spring force from leaf spring 150. Further, pawl 152 engages the cogs of sprocket 166 to provide an audible click and to function as a detent that retains cam shaft 160 in position. In the embodiment shown in FIG. 6, the sprocket rotates one cog, and therefore pawl 156 provides an audible click for every 0.2 degree of pivoting of sensor 80. Cam shaft assembly 160 may omit sprocket 166 and pawl 152, as the detent feature is optional, depending on the particular needs of the application.

Housing 110 may be installed onto conveyor 510 first by fastening it to wall 530 as described above. The light beam output from sensor 80 can be adjusted within housing assembly 110 by turning adjustment screw 160 to turn cam surface 168 to either drive down the front portion of sensor 80 against the spring force, or if desired to raise the light beam, to back off cam surface 168 to permit the spring force to drive the front portion of sensor 80 upwardly for angular alignment of the light beam.

When the desired position of sensor 80 is achieved, bolts 76 and 78, and anti-slip surface 79 may function as explained for first embodiment housing assembly 10.

Other structures are contemplated. For example, the adjustment screw disclosed in the first embodiment assembly may employ a detent and/or audible click mechanism to provide feedback as to the degree of movement of the sensor. The housing may include gearing such that greater rotational movement (such as an adjustment screw 60 or cam shaft 160) results a diminished movement of sensor 80 according to the overall gear ratio, thereby decreasing sensitivity of the adjustment to enable finer adjustment.

The present invention has been illustrated using structure and function of the embodiments (that is, examples) disclosed herein. The present invention is not limited to the structure and/or functions disclosed herein. For some non-limiting examples, the present invention encompasses any type of biasing means and is not limited to springs or any type of springs (rather, the term "spring bias" and the like is meant to broadly include any spring-type biasing means), nor to any configuration or placement of the biasing means and the pivot axis of the sensor; nor is the present invention limited to any type or location of sensor; nor to any particular type or location on a conveyor, or even to a conveyor at all; nor is the present invention limited to any use or location of the housings, nor to any particular details of any embodiment. Further, the housing assemblies 10 and 110 are oriented such that the sensor pivots to move the beam in an up and down orientation, and it is understood that the present invention is not limited to the orientation of the assembly nor up and down adjustment. Assemblies 10 and 110 are configured to adjust a light beam around one axis, and the structure and function of the present invention can be combined with additional features to expand the capability of the device. Thus, the inventors intend that the invention be given its full scope as defined in claims.

What is claimed:

1. An adjustable sensor assembly comprising:
a housing including a housing body;
a photoelectric sensor including a sensor body and a pivot axis;
a spring configured to rotationally bias the sensor body about the pivot axis relative to the housing body in a spring-bias direction; and
a rotatable element configured to pivot the sensor body in a direction opposite the spring-bias direction.

2. The assembly of claim 1 wherein the rotatable element is an adjustment screw that upon turning pivots the sensor body in the direction opposite the spring-bias direction.

3. The assembly of claim 1 wherein the rotatable element is cam shaft that is configured to rotate relative to the housing body, wherein upon turning the cam shaft pivots the sensor body in the direction opposite the spring-bias direction.

4. The assembly of claim 3 further comprising a sprocket connected to the cam shaft and a pawl fixed relative to the housing body, wherein the pawl is configured to engage the sprocket for forming a detent configured to retain the cam shaft in a desired rotational position.

5. The assembly of claim 1 the pivot axis is formed by a pivot shaft extending through a pivot aperture in the sensor body.

6. The assembly of claim 5 wherein the sensor body includes a slotted opening that is spaced apart from the pivot aperture, and the assembly further comprises a locking bolt extending through the slotted opening.

7. The assembly of claim 6 wherein housing body includes a main portion and a free-floating sidewall that is moveable relative to the main portion of the housing body, the pivot shaft and the locking bolt extending through the free-floating sidewall.

8. The assembly of claim 7 wherein the free-floating sidewall is removable relative to the main portion of the housing body and engaged with the main portion of the housing body by pins.

9. The assembly of claim 8 wherein the locking bolt is configured to lock the sensor in a desired rotational position.

10. The assembly of claim 9 further comprising an anti-slip surface on or between sidewalls of the sensor body and the housing body.

11. A conveyor system comprising:
a conveyor having a discharge end;
a mechanically adjustable sensor assembly of claim 1 mounted to a sidewall of the conveyor proximate the discharge end; and
a reflector mounted opposite the sensor assembly.

12. The conveyor system of claim 11 wherein the conveyor is mounted on a battery powered, mobile drive unit.

13. The conveyor system of claim 11 wherein the sidewall is formed of sheet metal.

14. A method of aligning a light sensor located in a housing mounted to a sidewall, comprising the steps of:
a. turning a rotatable element to apply a force to a sensor body and thereby pivot the sensor body relative to a housing body and against a spring bias force; and
b. after the turning step, locking the sensor body relative to the housing body.

15. The method of claim 14 wherein the turning step includes turning an adjustment screw that is located in threads formed in the housing body.

16. The method of claim 14 wherein the turning step includes turning a cam shaft that is mounted on the housing body.

17. The method of claim 16 wherein the turning step includes a pawl engaging a sprocket to retain the cam shaft in a desired position while performing the locking step.

* * * * *